3,326,768
ANTIPERSPIRANT COMPOSITION

Francis S. Kilmer MacMillan, Cincinnati, Ohio, assignor to The Procter & Gamble Company, Cincinnati, Ohio, a corporation of Ohio
No Drawing. Original application June 29, 1964, Ser. No. 379,023. Divided and this application June 9, 1966, Ser. No. 568,087
7 Claims. (Cl. 167—90)

This application is a division of copending patent application Ser. No. 379,023, filed June 29, 1964.

This invention relates to new compounds having anticholinergic properties. More particularly this invention relates to novel esters of scopolamine and to antiperspirant formulations containing same.

Anticholinergic compounds such as atropine and scopolamine have been used in the treatment of certain pathological cases of excessive perspiration. The eccrine sweat glands, which secrete most of the liquid sweat, are activated by a chemical "mediator" which is liberated at nerve endings when they are properly stimulated. This "mediator" is thought to be acetylcholine, and anticholinergic compounds reduce perspiration by interfering with the action of acetylcholine, probably by blocking the receptor sites of the secretory cells of the sweat glands.

Although the potential utility of anticholinergic compounds in cosmetic antiperspirant formulations has long been recognized, such utilization has been retarded because the classic anticholinergics do not provide adequate inhibition of perspiration at a level of usage which is physiologically safe. Only recently have safe and effective antiperspirant formulations based on anticholinergic compounds become available. These formulations, disclosed in British Patent 940,279, published Oct. 30, 1963, contain certain anticholinergic scopolamine esters as active ingredients.

Although the antiperspirant formulations of the British patent are highly effective, the anticholinergic compounds employed therein can hydrolyze and the formulations thereby lose activity over protracted periods of time. Investigators, therefore, continue to search for more stable and effective anticholinergic compounds.

It is an object of this invention to provide new compounds having improved anticholinergic properties.

It is a further object of this invention to provide an antiperspirant formulation with improved efficacy in reducing the amount of perspiration.

It is a still further object of this invention to provide antiperspirant compositions which maintain activity over protracted periods of time.

These and other objects are accomplished with an antiperspirant composition containing as an active ingredient a para-(lower)alkoxy benzoyl ester of scopolamine or an acid salt thereof. ("Lower" as used herein means containing not more than about 5 C atoms.)

The free base form of the compounds of this invention have the following structural formula:

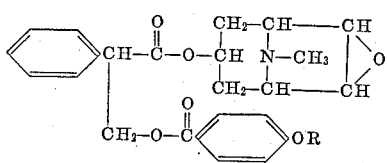

wherein R is an alkyl radical having not more than about 5 carbon atoms. The preferred acid forming anions which yield the acid salt form of the compound of this invention are chloride, bromide, and iodide. Other anions which yield acid salts encompassed by this invention are nitrate, citrate, acetate, methosulfate, sulfate, phosphate, tartrate, lactate and benzoate.

Example I

Para-methoxybenzoyl scopolamine hydrobromide was prepared in the following manner:

(a) To a suspension of 64.0 grams (0.17 mole) of anhydrous scopolamine hydrobromide in 166 ml. of dry pyridine was added 42.6 grams (0.25 mole) of para-methoxybenzoyl chloride (anisoyl chloride). The mixture became warm and the solid dissolved giving a red solution. After standing at room temperature for five days, the solvent was removed by distillation under reduced pressure and at a temperature below 40° C. The residue was washed with ice-water and 500 ml. of a 10% aqueous sodium carbonate solution. The wash solution was decanted and the residue was extracted twice with ether. The aqueous solution was then made strongly basic with a sodium hydroxide solution and again extracted with ether. The combined ether extracts were washed with water and a saturated sodium chloride solution and then dried over anhydrous sodium sulfate. Evaporation of the ether left 94.3 grams of crude free base (para-methoxybenzoyl scopolamine) as a brown oil which was soluble in ethanol.

(b) An ethanolic solution of 94.3 grams of this base was acidified with hydrogen bromide gas. The solution was diluted with ether and the crude para-methoxybenzoyl scopolamine hydrobromide separated as a white-yellow solid; this was recrystallized from water giving 77.5 grams (90.2% over-all yield) of white crystals, having a melting point of 198–199° C.

Analysis.—Calcd. for $C_{25}H_{28}BrNO_6$: C, 57.92; H, 5.44; Br, 15.42; N, 2.70. Found: C, 57.80; H, 5.90; Br, 15.7; N, 2.70.

Further confirmation of the structure of this ester was obtained from the infrared spectrum and nuclear magnetic resonance spectrum.

In like manner, corresponding acid salts can be prepared by acidifying the base derived from (a) above with other acids such as, for example, HCl, HI, $HNO_3$, $H_3PO_4$, $H_2SO_4$, $CH_3COOH$, $CH_3CH_2COOH$,

$CH_3CHOHCOOH$, $C_6H_5COOH$, 2 - hydroxy-1,2,3-propane-tricarboxylic acid, or dihydroxy-succinic acid, in place of HBr in step (b).

Para-ethoxybenzoyl scopolamine is prepared by substituting 0.25 mole of para-ethoxybenzoyl chloride for para-methoxybenzoyl chloride in step (a). Similarly, para-propoxybenzoyl scopolamine is prepared by substituting .25 mole of para-n-propoxybenzoyl chloride for para-methoxybenzoyl chloride in step (a). Para-isopropoxybenzoyl chloride, para-n-butoxybenzoyl chloride, or para-pentoxybenzoyl chloride in a quantity of 0.25 mole can be used in place of para-methoxybenzoyl chloride to yield the corresponding esters of scopolamine.

Surprisingly the para-(lower) alkoxy substituent renders the benzoyl ester of scopolamine more stable to hydrolysis and improves antiperspirant efficacy. Thus, para-methoxybenzoyl scopolamine and acid salts thereof, for example, are substantially more stable and effective than benzoyl scopolamine as can be seen from the following test.

Aqueous solutions containing 0.25% of para-methoxybenzoyl scopolamine ·HBr were adjusted to varying pH's with HCl or NaOH and stored at 90° C. for varying intervals of time. Thereafter these solutions were analyzed to determine the percent of hydrolysis at each interval. The results are set forth in Table 1 below.

TABLE 1

| Compound | pH | Percent Hydrolysis at 90° C. | | |
|---|---|---|---|---|
| | | 24 hours | 48 hours | 96 hours |
| I. Para-methoxybenzoyl scopolamine. HBr. | 3.0 | 0.0 | 0.0 | 0.0 |
| | 5.0 | 8.2 | 14.6 | 18.2 |
| | 6.0 | 10.3 | 34.6 | 48.3 |
| | 6.5 | 22.8 | 35.5 | 44.6 |
| II. Benzoyl scopolamine.HBr | 3.0 | 0.0 | 0.0 | 0.0 |
| | 5.0 | 10.3 | 15.4 | 25.7 |
| | 6.0 | 16.3 | 41.9 | 62.5 |
| | 6.5 | 27.4 | 60.0 | 65.5 |

It can be seen that the para-methoxy substituted benzoyl ester is substantially more stable to hydrolysis than the unsubstituted benzoyl ester. Hydrolysis of the anti-cholinergic compound results in diminished antiperspirant activity. Thus, the above solutions containing benzoyl scopolamine·HBr, would be expected to have less antiperspirant activity than those containing para-methoxybenzoyl scopolamine HBr, after aging. To test this hypothesis, the above solutions were evaluated for antiperspirant activity after aging for 48 hours at 90° C. The aged solutions were diluted with water to provide a 0.25% solution (ignoring hydrolysis), and tested using the following method (hereinafter referred to as the "forearm method"):

A given area of the forearm of each test subject is treated three times with the composition to be tested, over a period of ten minutes, permitting the composition to dry each time. After 4 or 5 hours, the arm is washed with water and dried. A 1.5% solution of iodine in ethanol is then painted over the area and allowed to dry. A slurry of starch is placed over the area and the subject sits in a room at 100° F. for 5 to 15 minutes, depending on the subject. Any perspiration emitted releases iodine which reacts with the starch to give a visual indication (a blue-black color) of perspiration. The relative degree of perspiration inhibition is graded on a 0–4 scale, 0 indicating no antiperspirant effect, 4 indicating complete perspiration inhibition. A value of 3 on this scale represents about 80% inhibition, 2 about 60% and 1 about 30%. The results obtained with the respective aged solutions are set forth in Table 2 below:

TABLE 2

| | pH | Average Degree of Inhibition |
|---|---|---|
| | | 24 hours (6 subjects) |
| I. Para-methoxybenzoyl scopolamine.HBr | 3.0 | 3.8 |
| | 5.0 | 3.4 |
| | 6.0 | 2.8 |
| | 6.5 | 2.6 |
| II. Benzoyl scopolamine | 3.0 | 3.7 |
| | 5.0 | 3.3 |
| | 6.0 | 1.8 |
| | 6.5 | 0.4 |

As the pH of the aged solutions increases the antiperspirant activity of the solutions decrease with time reflecting greater hydrolytic stability for both compounds at lower pH. It is apparent, however, that the antiperspirant activity of the benzoyl scopolamine·HBr solutions diminishes more rapidly than the para-methoxybenzoyl scopolamine·HBr solutions.

The para-(lower) alkoxy benzoyl ester of scopolamine has a surprisingly high degree of antiperspirant activity, even greater than the $C_4$–$C_{12}$ scopolamine esters of British Patent 940,279, including the benzoyl ester. Extremely small amounts provide essentially complete inhibition of perspiration with no evidence of physiological side effects, e.g. dryness of mouth, toxicity or action on the central nervous system. Both the location and the nature of the benzoyl substituent appear to be critical to the attainment of improved stability and antiperspirant efficacy.

Because of the unique properties of the compounds of this invention, greatly improved antiperspirant compositions can be prepared. The antiperspirant compositions of this invention contain as an antiperspirant agent at least one compound selected from the group consisting of para-(lower) alkoxybenzoyl scopolamine and the acid salts thereof.

The antiperspirant agent can be employed in amounts not less than about 0.001% to provide antiperspirant efficacy and not more than about 0.25% to provide a margin of safety to ensure that there are no adverse physiological effects incident to repeated use of the composition. The preferred ange is .005% to 0.05% (all parts and percentages herein are by weight).

The compositions of this invention should be formulated so that they have a pH in aqueous solution of not less than about 3.0 nor more than about 6.5. As shown supra, hydrolytic stability is greatest at lower pH's. However, irritation of the skin may be encountered at pH's lower than 3. At pH's above about 6.5 and especially at elevated temperatures, hydrolysis of the ester occurs at a rate such that a significant loss of antiperspirant activity will occur.

Preferably, the compositions of this invention are adjusted to pH 3–4 with a strong acid such as HCl, $HNO_3$, $H_2SO_4$ etc., and are essentially free of buffering materials other than the para-alkoxybenzoyl scopolamine salts. The compounds of this invention are best able to penetrate the skin and exert their antiperspirant effect at about pH 6.0. In the absence of buffering materials, the neutralizing potential of normal skin is sufficient to bring the pH of the composition near the optimum for skin penetration, soon after application. Because the concentration of anticholinergic agent employed in the compositions of this invention is so low, the buffering capacity of the para-alkoxybenzoyl scopolamine salts is not sufficient to prevent a pH rise to about 6.0 when the compositions are applied to the skin. The hydrohalide salts of para-alkoxybenzoyl scopolamine have a lower buffer capacity than do the hydroacetate salts for example and are therefore preferred from the standpoint of penetrability.

The antiperspirant compositions of this invention contain para-alkoxybenzoyl scopolamine or a salt thereof, in the above stated concentration ranges, uniformly dispersed in a water miscible, dermatologically acceptable carrier. (Dispersion is intended to include solution.) Such a carrier must be non-toxic, compatible with the human skin, and must not prevent absorption of the active antiperspirant ingredient by the skin. Such carriers are well known in the cosmetic industry and their choice is not critical to the efficacy of the compositions provided that they do not have a buffering action which interferes with the desired pH rise when the composition is applied to the skin or prevent absorption in some other manner.

Examples of suitable water miscible, dermatologically accepable carriers are: water, water-soluble alcohols (monohydric and polyhydric alcohols, particularly lower alcohols, $C_1$–$C_8$—e.g., ethanol propanol, glycerol, sorbitol ethylene glycol, hexylene glycol, mannitol, propylene glycol); polyethylene glycols and methoxypolyethylene glycols (Carbowaxes having molecular weights ranging from 200 to 20,000); glyceryl monolaurate, monopalmitate or monostearate; polyethylene glycols esterified with higher fatty acids; polyethylene glycerols; polyethylene sorbitols; glucose. Mixtures of two or more of the foregoing materials can also be used. For example, when alcohols or their derivatives are used, some water is nearly always included since such materials are usually hygroscopic.

The carrier should be water miscible to fulfill the above requirements, particularly absorption by the skin. Petroleum based substances and other water immiscible substances, e.g., mineral oil, petroleum jelly, stearolyl diacetin, lanolin, paraffin, and beeswax appear to slow the absorption of the active antiperspirant ingredient by the skin. However, such substances can be used in an antiperspirant formulation if there is sufficient water miscible vehicle present to provide a medium for absorption by the skin. Emulsification of such substances will also provide a means for their use.

Preferably, the carrier contains about 0.1% to about 10% of a nonionic, cationic or amphoteric surface active agent; the preferred amount is in the range of about 0.1% to about 2%. The upper limit of such surface active agents (surfactant) is not critical although large amounts may be unsuitable in formulations where excessive foaming would be undesirable. The presence of a surface active agent appears to increase still further the already surprising efficacy of the compounds of this invention. It is believed that the surface active agent provides a more efficient absorption by the skin of the active antiperspirant ingredient of the compositions of this invention. Cationic, and particularly nonionic surface active agents are desirable although anionic non-soap surfactants are also suitable. Anionic non-soap surfactants may tend to interact slightly with the para-alkoxybenzoyl scopolamine acid salts. Anionic non-soap surfactants are preferably used at concentrations of about 0.01% to about 0.5% and desirably below about 0.1%.

Water soluble nonionic surfactants are highly suitable for use in this invention; they include detergent compounds produced by the condensation of alkylene oxide groups (hydrophilic in nature) with an organic hydrophobic compound which may be aliphatic or alkyl aromatic in nature. Examples of such detergents are: the polyalkylene glycol esters, ethers, and thioethers of the types, $$RCOO(-C_2H_4O)_n-H$$
$$RO(-C_2H_4O)_n-H$$
$$RS(-C_2H_4O)_n-H$$

wherein R represents a long chain alkyl radical having from about 8 to about 18 carbon atoms and $n$ is an integer from about 4 to about 30; the polyethylene oxide condensates of alkyl phenols, e.g. the condensation products of alkyl phenols having about 6 to 12 carbon atoms in the alkyl group, in either straight chain or branched chain configuration, with ethylene oxide in amounts equal to 10 to 25 moles of ethylene oxide per mole of alkyl phenol; compounds formed by condensing ethylene oxide with a hydrophobic base formed by the condensation of propylene oxide with propylene glycol; the condensation product of ethylene oxide with the product resulting from the reaction of propylene oxide and ethylene diamine. More specific examples of some suitable nonionic detergents are: the reaction products of one mole of t-octylphenol with an average of from 9 to 30 moles of ethylene oxide, and the water-soluble waxy reaction products of one mole of lauryl or oleyl alcohol and 10 to 30 moles of ethylene oxide.

The preferred nonionic surfactant is available on the market under the trade name of "Pluronic." These compounds are formed by condensing ethylene oxide with a hydrophobic base formed by the condensation of propylene oxide with propylene glycol. The hydrophobic portion of the molecule exhibits water insolubility. Its molecular weight is of the order of 1500 to 1800. The addition of polyoxyethylene radicals to this hydrophobic portion tends to increase the water solubility of the molecule as a whole. Liquid products are obtained up to the point where the polyethylene content is about 50% of the total weight of the condensation product. Further increase in the relative content of polyoxyethylene to hydrophobic portion renders the final product wax-like or solid in consistency. The molecular weight of Pluronic L61, L64, and F68 which find particular utility in the practice of the present invention are about 2000, 3000 and 8000 respectively.

Examples of polar nonionic surfactants which are also suitable for use in this invention are tertiary trialkyl amine oxides wherein one alkyl group contains 10–18 carbon atoms and the other alkyl groups are short chain groups such as methyl, ethyl and propyl (a specific example is dodecyldimethylamine oxide); and tertiary trialkyl phosphine oxides wherein one alkyl group contains 10–18 carbon atoms and the other alkyl groups are short chain groups such as methyl, ethyl, and propyl (a specific example is dodecyldimethylphosphine oxide).

Examples of cationic surfactants suitable for practice of this invention are the detergent quaternary ammonium salts. Such salts have the general formula:

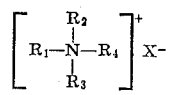

wherein $R_1$ is a hydrophobic radical and $R_2$, $R_3$ and $R_4$ are each hydrocarbon radicals. $R_1$ can be aliphatic, unsaturated, aliphatic, cycloaliphatic, acyl, aliphatic aryl and aryl aliphatic radicals containing 8 to 25 carbon atoms, e.g., branched or normal chain alkyl phenoxy alkoxy alkyl; branched or long chain alkyl cresoxy alkoxy alkyl, long chain alkoxyaryl, branched or long chain alkyl phenoxy alkyl, long chain alkyl aryl, halogen substituted long chain alkylaryl, aryl alkyl, long chain alkyl, long chain alkenyl and cycloalkyl, $R_2$, $R_3$ and $R_4$ can contain each 1 to 10 carbon atoms, wtih the total carbon atoms in the three radicals being from 3 to 12. Examples of $R_2$, $R_3$ and $R_4$ are low molecular weight alkyl, preferably methyl or ethyl, or aryl, preferably phenyl, or arylalkyl, preferably benzyl.

X is a salt forming radical which is an anionic radical capable of forming a water-soluble salt. Chloride and bromide are preferred but halides generally, sulfate, phosphates, methosulfate, and other salt forming ions are also satisfactory.

Specific examples of suitable cationic detergents are: cetyltrimethylammonium bromide; dodecyldimethylbenzylammonium chloride; N(lauroyl colomino formylmethyl)pyridinium chloride; cetylpyridinium bromide; chlorinated dodecylbenzyltrimethylammonium chloride; benzethonium chloride.

Examples of amphoteric detergent surfactants are the substituted betaines and sultaines such as hexadecyldimethylammonio propionate and 3-(hexadecyldimethylammonio)-propane-1-sulfonate; alkyl beta imino dipropionates and alkyl beta amino propionates, wherein the alkyl group contains 10 to 20 carbon atoms, and imidazoline derivatives of the Miranol class. Other examples of amphoteric surfactants may be found in "Surface Active Agents," Schwartz and Perry, pages 218–228 and "Surface Active Agents and Detergents," vol. II, Schwartz, Perry and Berch, pages 138–143.

Examples of anionic non-soap surfactants suitable for the practice of this invention are the detergents of the sulfonated and sulfated types such as the alkyl ($C_8$–$C_{18}$) sulfates, the alkyl ($C_8$–$C_{18}$) polyethenoxy (1–10 units of —$C_2H_4O$—) ether sulfates, the alkyl ($C_8$–$C_{18}$) aromatic sulfonates, the mono- or di-alkyl ($C_8$–$C_{18}$) esters of sulfosuccinic acid, sulfonated or sulfated amides of higher fatty acids, sulfuric acid esters of polyhydric alcohols incompletely esterified with higher fatty acids, higher fatty acids esters of low molecular weight alkylol sulfonic acids, etc., usually in the form of their sodium, potassium, ammonium, or alkanolammonium salts. Some of the particular detergents of this category are: sodium octyl sulfate, sodium nonyl sulfate, sodium decyl sulfate, monoethanolammonium dodecyl sulfate, ammonium tetradecyl sulfate, monoethanolammonium pentadecyl sulfate, monoethanolammonium hexadecyl sulfate, monoethanolammonium octadecyl sulfate, monoethanolammonium oleyl sulfate, sodium salts of dioctyl sulfosuccinate, sodium octyl benzene sulfonate, sodium nonyl benzene sulfonate, sodium dodecyl benzene sulfonate, sodium tetradecyl benzene sulfonate, ammonium pentadecyl benzene sulfonate, ammonium triisopropyl benzene sulfonate, sodium salts of the oleic acid ester of isethionic acid, sodium salt of the lauric acid amide of taurine, triethanolammonium coconut oil monoglyceride monosulfate, monoethanolammonium tallow diglyceride monosulfate. N-lauroyl sarcosinates are also suitable.

Fatty acid soaps, e.g., sodium coconut or tallow soap, are not desirable because of hydrolysis at the preferred pH of the compositions of the invention.

Two methods were used to test the effectiveness of the antiperspirant compositions of this invention and other compositions with which they were compared. These were the "forearm" method described supra, and the "axilla" method.

The axilla method involves direct measurement of the weight of perspiration secreted in the axilla. This is very significant, since the axilla is the area of most practical importance in the inhibition of perspiration. The axilla method uses a gravimetric measure of the amount of perspiration produced in the axilla to determine antiperspirant effect. One hour after application of the composition to be tested, the subjects were placed in a room at 100° F. which has a relative humidity of about 40–50%. After a "warmup" period of ½ hour, the axillae were washed and dried. Then tared Webrill pads for the collection of perspiration were placed in the axillae of each arm for 10 minutes after which another set of pads were placed in the axillae for 10 minutes. After a 20 minute interval the axillae were wiped dry and two more sets of pads were used for two 10 minute periods each. The procedure was repeated and additional collections are made by the same procedure for as long as desired. Each time the pads were removed from the axillae, they were placed in tared tightly covered jars and weighed to determine the amount of perspiration produced. In the course of the test, the perspiration collection 3 hours after application is a convenient and significant time for comparison purposes.

While the amounts of perspiration produced in the left and right axilla of a subject are usually not the same, a given subject will have a reasonably consistent ratio of output between the two sides. A normal ratio for a subject was established by making four or five control runs before any treatment was applied. When the antiperspirant composition to be tested was applied to one axilla (the other one being the control), the normal ratio was significantly altered. The reduction in sweating produced by the antiperspirant being tested was obtained by fitting the results from the axilla method into the following formula:

Percent reduction in sweating=
$$100 - \frac{(\text{Antiperspirant test ratio})}{(\text{Average untreated ratio})} \times 100$$

*Example II*

The antiperspirant efficacy of benzoyl and paramethoxybenzoyl esters of sapolamine hydrobromide was compared using the axilla method. One ml. of a 0.025% solution of the respective esters adjusted to pH 3.0 with HCl was applied to the auxiliary area of ten subjects. The following results were obtained:

| Material applied | Average Percent Inhibition of Sweating Time after Application | |
|---|---|---|
| | 3 hours | 24 hours |
| Para-methoxybenzoyl scopolamine hydrobromide | 95 | 40 |
| Benzoyl scopolamine hydrobromide | 70 | 20 |

It can be seen that the antiperspirant activity of the para-methoxy substituted ester is more rapid in onset and is longer lasting than that of the art-disclosed unsubstituted benzoyl ester. Similar results are obtained with the other para-alkoxy substituted benzoyl scopolamine compounds of this invention or mixture of these compounds.

The antiperspirant compositions of this invention are illustrated by the following examples:

*Example III*

A liquid antisperspirant composition in accordance with this invention was fomulated as follows.

Compound: Percent by weight
Para-methoxybenzoyl scopolamine hydrobromide _____ 0.025
Condensation product of 1 mole of cetyl alcohol with 20 moles of ethylene oxide ___ 1.0
Hydroxyethylcellulose _____ 0.3
Ethanol _____ 5.0
Perfume _____ 0.1
Water _____ Balance
HCl to pH 3.0.

This composition was tested using the axilla method. Grading of the subjects 3 hours after application of the composition revealed an average 94% reduction in axillary sweating. No adverse physiological symptoms were experienced by the test subjects.

Para-methoxybenzoyl scopolamine, para-ethoxybenzoyl scopolamine hydrochloride, para-isopropoxybenzoyl scopolamine hydronitrate can be used in place of the hydrobromide salt in this composition with substantially equal results.

*Example IV*

Another antiperspirant formulation was prepared having the following composition.

Compound: Percent by weight
Para-methoxybenzoyl scopolamine hydrobromide _____ 0.025
Spermaceti _____ 2.0
Butyl myristate _____ 4.0
Glyceryl monostearate _____ 10.0
Polyoxyethylene stearate _____ 5.0
Glycerin _____ 3.0
$TiO_2$ _____ 0.1
Perfume _____ 0.1
Behenic acid _____ 5.0
Distilled water _____ Balance
HCl to pH 3.0.

This composition was tested for antiperspirant efficacy using the axilla method and yielded an average of 82.5% reduction in axillary sweating three hours after application. No adverse physiological effects resulted from use of this composition.

The para-methoxybenzoyl scopolamine hydrobromide employed in this composition can be replaced by para-n-propoxybenzoyl scopolamine hydroacetate, para-pentoxybenzoyl scopolamine hydrocitrate, or para-methoxybenzoyl scopolamine hydrochloride with substantially equivalent results.

Example V

Several additional antiperspirant compositions are prepared in accordance with this invention as follows:

(A)

| | Percent by weight |
|---|---|
| Para-methoxybenzoyl scopolamine | 0.005 |
| Perfume | 0.10 |
| Water | Balance |

H₂SO₄ to pH 3.0.

(B)

| | |
|---|---|
| Para-methoxybenzoyl scopolamine hydrochloride | 0.05 |
| Pluronic F-68 (condensation product of ethylene oxide with a hydrophobic based, formed by the condensation of propylene oxide with propylene glycol) | 1.00 |
| Perfume | 0.10 |
| Water | Balance |

H₃PO₄ to pH 4.0.

(C)

| | |
|---|---|
| Para-methoxybenzoyl scopolamine | 0.10 |
| Cetyl trimethylammonium bromide | 0.50 |
| Perfume | 0.10 |
| Water | Balance |

HNO₃ to pH 3.5.

(D)

| | |
|---|---|
| Para-methoxybenzoyl scopolamine hydrobromide | 0.05 |
| Uniformly dispersed in a mixture of polyethylene glycols (Carbowaxes) 62½% of which have a molecular weight of 1500 and 37½% of which have a molecular weight of 4000 | 99.85 |
| Perfume | 0.10 |

(E)

| | |
|---|---|
| Para-methoxybenzoyl scopolamine | 0.05 |
| Para-isopropoxybenzoyl scopolamine hydrobromide | 0.05 |
| Perfume | 0.10 |
| Water | Balance |

HCl to pH 3.0.

(F)

| | |
|---|---|
| Para-methoxybenzoyl scopolamine hydrobromide | 0.05 |
| Sodium dodecylbenzene sulfonate | 0.10 |
| Perfume | 0.10 |
| Water | Balance |

HCl to pH 3.5.

(G)

| | |
|---|---|
| Para-methoxybenzoyl scopolamine hydrobromide | 0.05 |
| Absolute ethanol | 99.90 |
| Perfume | 0.05 |

(H)

| | |
|---|---|
| Para-n-butoxybenzoyl scopolamine hydrobromide | .025 |
| Perfume | 0.5 |
| Water | Balance |

HCl to pH 3.0.

When tested by the axilla method each of the above compositions show significant reductions in perspiration. No skin irritation or toxic side effects result, even after repeated usage. In composition B in Example VI, 1% sodium lauryl beta imino dipropionate can be substituted for the Pluronic F-68 with substantially equal results.

While the compositions of the present invention find their greatest utility as antiperspirants topically applied to the axillary areas of the body, it was found that they also have surprising utility for use on other parts of the body. For example, the compositions topically applied, substantially completely inhibited sweating of the palms of hands and soles of the feet. This aspect of the invention is useful for those people who are troubled with "clammy" hands or whose feet are cold because of dampness caused by sweating. Moreover, inhibition of sweating on the palms of the hands and the soles of the feet will provide relief for dermatitis which is aggravated by perspiration. Forehead sweating can also be successfully inhibited, as for example, in the case of surgeons or technicians who are under stress and who must use both hands. Amounts of para-alkoxybenzoyl scopolamine esters greater than at the 0.25% level can be used to control extreme sweating if done with care, as for example by a physician.

What is claimed is:

1. The process of inhibiting perspiration which comprises the step of applying to the human skin a composition containing from about 0.001% to about 0.25% of at least one anticholingergic material selected from the group consisting of a para-(lower)alkoxybenzoyl scopolamine and acid salts thereof, uniformly dispersed in a water-miscible, dermatologically acceptable carrier.

2. An antiperspirant composition comprising not less than about .001% and not more than about 0.25% of at least one anticholinergic material selected from the group consisting of para-(lower)alkoxybenzoyl scopolamine and the acid salts thereof, and a water-miscible, dermatologically acceptable carrier.

3. The antiperspirant composition of claim 2 wherein the anticholinergic material is para-methoxybenzoyl scopolamine.

4. The antiperspirant composition of claim 2 wherein the anticholinergic material is para-methoxybenzoyl scopolamine hydrobromide.

5. An antiperspirant composition comprising from about .005% to about 0.05% of at least one anticholinergic material selected from the group consisting of para-methoxybenzoyl scopolamine and the acid salts thereof, uniformly dispersed in a water-miscible dermatologically acceptable carrier selected from the group consisting of water, lower monohydric and polyhydric alcohols, polyethylene glycols, methoxy polyethylene glycols, and mixtures thereof.

6. An antiperspirant composition comprising not less than about .001% and not more than about 0.25% of at least one anticholinergic material selected from the group consisting of a para-(lower)alkoxbenzoyl scopolamine and the acid salts thereof, and from about 0.01% to about 2.0% of a surface active agent selected from the group consisting of nonionic, cationic, amphoteric and non-soap anionic surface active agents, and water, said composition having a pH within the range from about 3 to about 6.5.

7. The antiperspirant composition of claim 1 wherein the surface active agent is nonionic.

References Cited

F. S. Kilmer MacMillan et al.: "The antiperspirant Action of Topically Applied Anticholinergics," J. Invest. Dermat. 43 (5): 363-377, November 1964.

LEWIS GOTTS, *Primary Examiner.*

SHEP K. ROSE, *Assistant Examiner.*